(12) United States Patent
Hada

(10) Patent No.: US 9,134,898 B2
(45) Date of Patent: Sep. 15, 2015

(54) DISPLAY CONTROL APPARATUS AND CONTROL METHOD THEREOF

(75) Inventor: Tetsuya Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 12/854,810

(22) Filed: Aug. 11, 2010

(65) Prior Publication Data

US 2011/0043472 A1  Feb. 24, 2011

(30) Foreign Application Priority Data

Aug. 18, 2009  (JP) ................. 2009-189329

(51) Int. Cl.
*G06F 3/041* (2006.01)
*G06F 3/0488* (2013.01)

(52) U.S. Cl.
CPC .................. *G06F 3/04883* (2013.01)

(58) Field of Classification Search
CPC ............. G06F 2203/04806; G06F 2203/04808
USPC ................... 345/173–178, 163–167; 715/863
See application file for complete search history.

(56) References Cited

U.S. PATENT DOCUMENTS

| | | | |
|---|---|---|---|
| 5,570,113 A | 10/1996 | Zetts | |
| 6,610,936 B2 * | 8/2003 | Gillespie et al. | 178/18.01 |
| 7,453,439 B1 * | 11/2008 | Kushler et al. | 345/168 |
| 2003/0214488 A1 * | 11/2003 | Katoh | 345/173 |
| 2006/0267966 A1 * | 11/2006 | Grossman et al. | 345/179 |
| 2009/0178010 A1 * | 7/2009 | Chaudhri | 715/863 |
| 2009/0259960 A1 * | 10/2009 | Steinle et al. | 715/771 |
| 2010/0180237 A1 * | 7/2010 | Buchanan et al. | 715/863 |

FOREIGN PATENT DOCUMENTS

| | | |
|---|---|---|
| JP | 05-127819 A | 5/1993 |
| JP | 07-200126 A | 8/1995 |
| JP | 08-016314 A | 1/1996 |
| JP | 2008-276495 A | 11/2008 |

* cited by examiner

*Primary Examiner* — Kent Chang
*Assistant Examiner* — Scott Au
(74) *Attorney, Agent, or Firm* — Canon USA Inc IP Division

(57) ABSTRACT

There is provided an apparatus that can prevent invoking of unintended functions in gesture operation. The apparatus displays gesture functions executable by movement of touch position, and when movement of touch position satisfies a first condition, confirms executable gesture functions to display confirmed functions. When the movement of touch position satisfies a second condition after the confirmation, the apparatus cancels the confirmation. When the touch input is released in the confirmed state, the apparatus executes the confirmed functions, and when the touch input is released in the canceled state, control does not execute gesture functions.

24 Claims, 10 Drawing Sheets

FIG.2

| GESTURE RECOGNITION PATTERN NAMES | GESTURE RECOGNITION PATTERN | | ASSIGNED FUNCTIONS |
|---|---|---|---|
| GESTURE 1 | ← | STROKE TO MOVE IN Y-DIRECTION BY A1 (<0) AND THEN TO MOVE IN X-DIRECTION BY D1 (<0) | FUNCTION F1 ··· ERASE |
| GESTURE 2 | → | STROKE TO MOVE IN Y-DIRECTION BY A1 (<0) AND THEN TO MOVE IN X-DIRECTION BY D2 (>0) | FUNCTION F2 ··· PROTECT |
| GESTURE 3 | ← | STROKE TO MOVE IN Y-DIRECTION BY A2 (>0) AND THEN TO MOVE IN X-DIRECTION BY D1 (<0) | FUNCTION F3 ··· ROTATE |
| GESTURE 4 | → | STROKE TO MOVE IN Y-DIRECTION BY A2 (>0) AND THEN TO MOVE IN X-DIRECTION BY D2 (>0) | FUNCTION F4 ··· SLIDE SHOW |

DISPLAY CONTROL APPARATUS AND CONTROL METHOD THEREOF

BACKGROUND OF THE INVENTION

1. Field of the Invention

The present invention relates to a display control apparatus for gesture operation input onto a touch panel and a control method thereof.

2. Description of the Related Art

In recent years, digital devices including a touch panel in a display unit, and enabling a user to perform an intuitive operation have appeared on the market. In these devices, it is possible not only to execute a function with a button icon placed on a display screen constituted by a touch panel, but also to call the function by performing gesture recognition.

In invoking a function by the gesture recognition, if an input trajectory on the touch panel matches a predetermined trajectory pattern, the function assigned in advance to the trajectory pattern will be invoked. Various functions can be assigned to the trajectory patterns, and a user can also assign arbitrary functions thereto.

When utilizing a function invocation by such the gesture recognition, the user may in some cases be aware that the user is doing wrong gesture operation halfway through dragging for gesture (hereinafter, may be sometimes referred to as gesture operation). For this reason, a technique for canceling a function invocation by the gesture recognition during gesture operation in progress is required.

For example, Japanese Patent Application Laid-Open No. 08-016314 discusses a method for canceling a function invocation by the gesture recognition, if gesture cancellation timeout period is exceeded while staying standstill halfway through a stroke by dragging, or a stroke is too large. Additionally, there is discussed a method for canceling a function invocation by the gesture recognition if an input from another input apparatus is performed while the gesture action is in progress.

However, according to a method discussed in Japanese Patent Application Laid-Open No. 08-016314, the gesture recognition is executed only after a user has performed the gesture operation, and released the finger from the touch panel. For this reason, the user cannot confirm halfway through the gesture operation how the gesture operation performed until present time has been recognized by the apparatus, and cannot find what functions will be invoked before the user leaves the finger from the touch panel.

For this reason, there is a problem in that, even when a pattern, which may invoke an unintended function, is erroneously input, the user cannot aware of it, accordingly cannot cancel it. As a result, an unintended function may be eventually executed.

SUMMARY OF THE INVENTION

According to an aspect of the present invention, an apparatus includes a detection unit configured to detect a touch input onto a display screen of a display unit, a display control unit configured to perform control to display on the display unit information indicating functions executable by a movement of a touch position by the touch input, out of functions assigned as functions executable by a gesture operation by the movement of the touch input, according to the movement of the touch input, a confirmation unit, when the movement of the touch position satisfies a first condition, configured to confirm functions executable by gesture operation, and display the confirmed function, a cancellation unit configured to cancel the confirmation when the movement of the touch position satisfies a second condition, and a control unit configured to perform control to execute a function, when the touch input is released while the function is being confirmed, and not to execute any of functions assigned to the gesture operations, when the touch input is released while the confirmation is canceled.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates assignments of gesture actions to applications.

DESCRIPTION OF THE EMBODIMENTS

Various exemplary embodiments, features, and aspects of the invention will be described in detail below with reference to the drawings.

Figure 1:
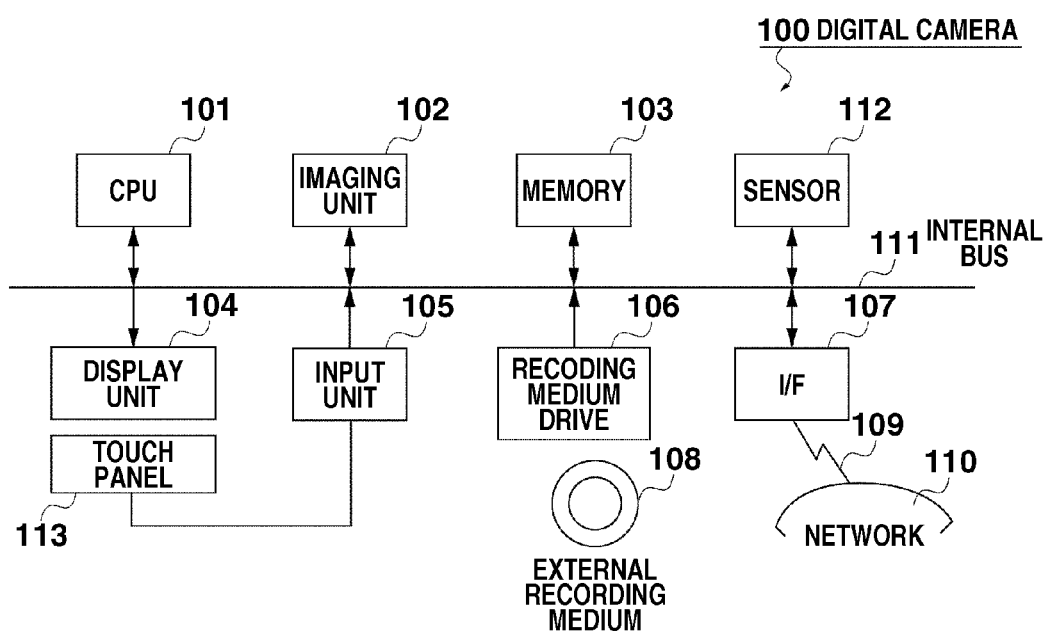
FIG. 1 is a block diagram of a digital camera.

FIG. 1 illustrates a configuration example of a digital camera 100 as an example of a display control apparatus by which the present invention can be implemented. A central processing unit (CPU) 101, which is an arithmetic processing apparatus that controls operation of a content management apparatus, accepts instructions from a user via an input unit 105 or the like, executes various types of programs described below, and performs display control of a display unit 104. An imaging unit 102 captured images.

A memory 103 is used as a work area of the CPU 101. The display unit 104 is used for displaying graphic user interface according to the present exemplary embodiment, and images and display items to be described below are displayed on the display screen.

The input unit 105 is used for accepting instructions from the user, and in the present exemplary embodiment, is an input device including a touch panel 113 provided on the display screen of the display unit 104. More specifically, the input unit 105 detects a touch input onto the display screen of the display unit 104, and provides the information thereof to the CPU 101. Users can execute content management program by using the input unit 105.

A storage medium drive 106 is a device for reading out data stored in an external storage medium 108 such as a compact disk read-only memory (CD-ROM), a digital versatile disk-ROM (DVD-ROM), a flash memory, and for writing data into the external storage medium 108. Images captured by the imaging unit 102, and programs, which the CPU 101 executes, are to be stored in the external storage medium 108. An I/F 107 is connected to a network 110 via a communication line 109.

A sensor 112 is a vibration detection unit including an acceleration sensor and the like, and detects attitudes and vibrations of the digital camera 100. The CPU 101 can execute various types of functions such as switching and rotation of the image displayed on the display unit 104, based on vibration detected by the sensor 112. The CPU 101 can also execute a program on the network 110 via the I/F 107, and the present invention can be applied to the program on the network 110.

As described above, the input unit 105 includes the touch panel 113, detects a touched position on the touch panel 113, and notifies the CPU 101 of detected position through an internal bus 111. The CPU 101 detects operations such as a touch with a finger or a pen on the touch panel 113, (hereinafter, referred to as touchdown), release (hereinafter, touchup, or release of touch input), move while touching (hereinafter, referred to as drag), based on notified touch position.

The CPU 101 determines that a stroke has been drawn when a series of operations has been performed from the touchdown via dragging by a given distance or more to the touchup on the touch panel 113. Then, if a shape of the stroke corresponds to any of gestures registered in advance, the CPU 101 executes the function associated with the corresponding gesture.

Preconditions for the present exemplary embodiment will be described. The gesture patterns indicating user's operation instructions, which the digital camera 100 can recognize, are illustrated in FIG. 2. In the present exemplary embodiment, the gesture patterns include four stroke patterns having a movement trajectory of the touch input in a first direction (Y-direction in the present exemplary embodiment) and subsequent movement trajectory of the touch input in a second direction (X-direction in the present example) in one stroke.

More precisely, the stroke pattern (first condition) is a pattern in which a movement component of the first direction of a touch position on a display screen has become equal to or greater than a predetermined distance, and subsequently a movement component in a second direction perpendicular to the first direction on the display screen of the touch position becomes equal to or greater than a predetermined distance. "Movement trajectory" refers to a trajectory to be drawn by dragging of the touch input.

Then, these patterns are named as a gesture 1, a gesture 2, a gesture 3, and a gesture 4. The X-component and Y-component of the touch input respectively refer to touch input components of X-direction and Y-direction on a coordinate system 700 illustrated in FIG. 7A.

Further, functions assigned in advance to these gestures are a function F1, a function F2, a function F3, and a function F4. In this case, the functions assigned to the function F1, F2, F3, and F4 are erasure of the image, protection of the image, rotation of the image, and slide show of the image, respectively. For example, in case of recognition determination of the gesture 1, an application of erasing the image can be called.

In a first exemplary embodiment, an example will be described, in which a user is allowed to recognize what function can be invoked, depending on a movement of the touch input position until the present time, before a function is invoked by the gesture operation, then if a movement in the opposite direction to the movement performed until the present time, is performed, the user can cancel the function invocation.

Figure 3:
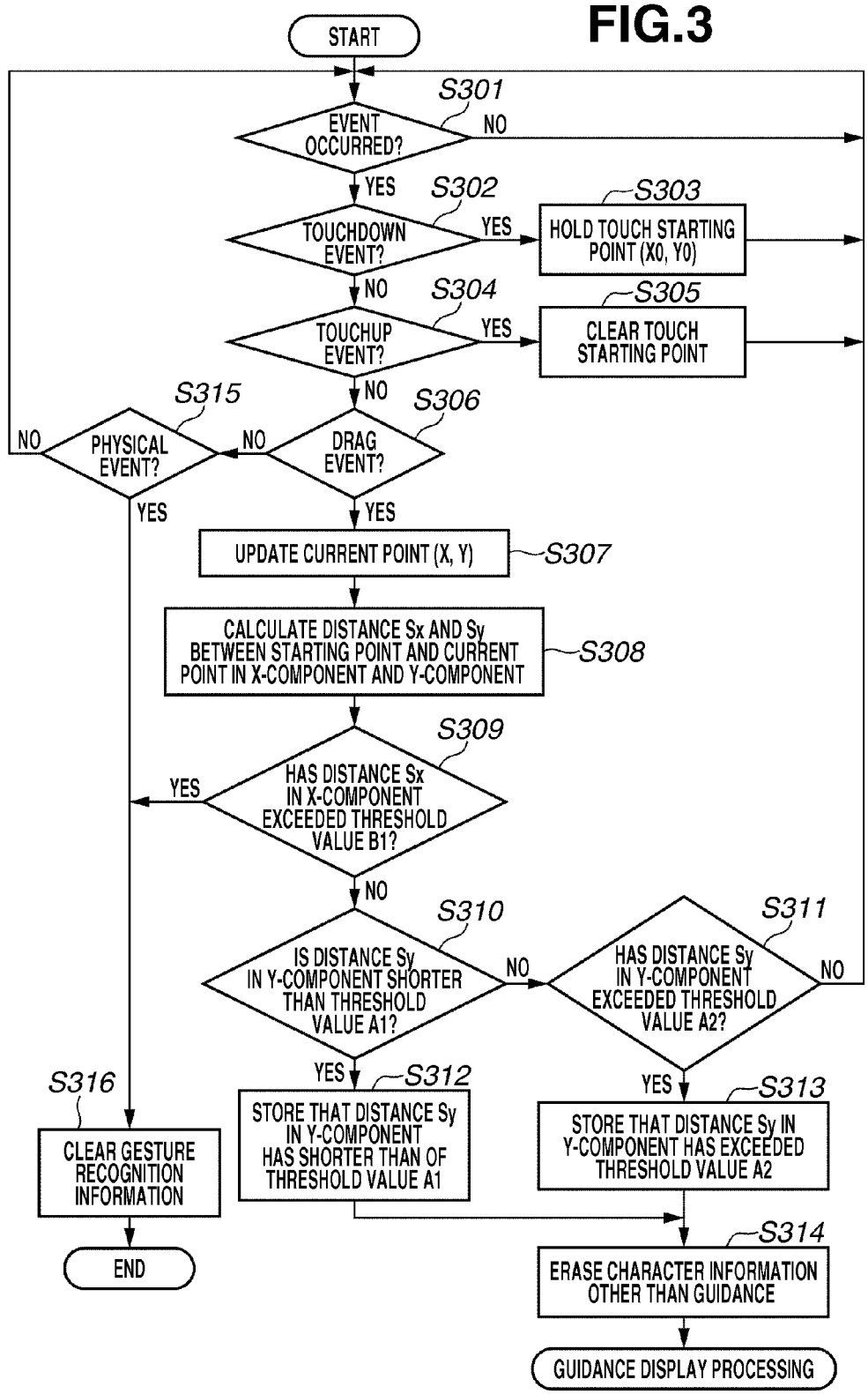
FIG. 3 is a flowchart illustrating gesture recognition processing.

FIG. 3 is a flowchart illustrating a flow from non-input state to guidance display processing. "Non-input state", as in FIG. 7A, refers to a state where images stored in the external storage medium 108 are displayed on the display unit 104, and no inputs are performed from the input unit 105. The processing illustrated in the flowcharts in FIG. 3, FIG. 4, FIG. 5, and FIG. 6, as will be described below, are realized by causing the CPU 101 to execute a program stored in the external storage medium 108.

In step S301, the CPU 101 monitors an input event from the input unit 105. Input event includes a touch input (touch up, touchdown, drag) to the touch panel 113, and an operation event from an input device other than the touch panel 113.

If an input event occurs (YES in step S301), then the processing proceeds to step S302. In step S302, the CPU 101 determines whether the input event detected in step S301 is a touchdown event. If it is determined that the input event is a touchdown event (YES in step S302), then the processing proceeds to step S303.

In step S303, the CPU 101 takes a touching point at this time as a starting point and holds the coordinates as P ($X_0, Y_0$) in the memory 103, and performs again event monitoring and waits until the next event reception occurs in step S301. On the other hand, in step S302, if it is determined that the input event is not a touchdown event (NO in step S302), the processing then the processing proceeds to step S304.

In step S304, the CPU 101 determines whether the event is a touchup event. If it is determined that the event is a touchup event (YES in step S304), then the processing proceeds to step S305. The CPU 101 clears the touch starting point P from the memory 103, and performs the event monitoring and waits until the next event reception occurs in step S301. On the other hand, in step S304, if it is determined that the event is not a touchup event (NO in step S304), then the processing proceeds to S306.

In step S306, the CPU 101 determines whether the input event is a drag event. If it is determined that the input event is a drag event (YES in step S306), then the processing proceeds to S307. The CPU 101 takes a touching point at this time as a current point, and holds the coordinates as C (X, Y) in the memory 103. Then the processing proceeds to step S308. On the other hand, in step S306, if it is determined that the input event is not a drag event (NO in step S306), then the processing proceeds to S315.

In step S308, the CPU 101 calculates an amount of displacement, i.e., a distance from the coordinates P of the starting point to the coordinates C of the current point, and holds a distance in X-component as Sx, and a distance in Y-component as Sy in the memory 103. Then, in steps S309 to step S11, the CPU 101 determines whether a trajectory of a touch input detected by the input unit 105 is a part of the gesture operations (a part of the gesture patterns illustrated in FIG. 2).

First, in step S309, the CPU 101 determines whether a distance Sx in the X-component has exceeded a threshold value B1. If the distance Sx in the X-component has exceeded the threshold value B1 (YES in step S309), that is, if an amount of displacement of the touch input in the X-direction has exceeded the threshold value B1, the touch input cannot be a gesture recognition candidate, and then the processing proceeds to step S316. On the other hand, if not exceeded (NO in step S309), then the processing proceeds to step S310.

In this process, a distance in the X-component has exceeded the threshold value B1, in other words, the touch input has moved too much in the X-direction. Accordingly, the touch input is recognized not to be a stroke in the Y-direction, which means that it does not hold true for gesture patterns that the digital camera 100 can recognize. Hence, the touch input is not the gesture recognition candidate.

In step S310, the CPU 101 determines whether a distance Sy in the Y-component is shorter than a threshold value A1 (<0). If the distance is shorter than the threshold value A1 (YES in step S310), then the processing proceeds to step S312. On the other hand, if the distance has not fallen short of the threshold value A1 (NO in step S310), then the processing proceeds to step S311. That a distance Sy in the Y-component is shorter than the threshold value A1 means that an amount of displacement in negative direction (upward direction on the touch panel) of a stroke in the Y-component has become greater than a distance |A1|.

On the other hand, in step S311, the CPU 101 determines whether a distance Sy in the Y-component has exceeded a threshold value A2 (>0). If the distance has exceeded the threshold value A2 (YES in step S311), then the processing proceeds to step S313. On the other hand, if the distance has not exceeded the threshold value A2 (NO in step S311), then the processing proceeds to step S301.

That the distance Sy in the Y-component has exceeded the threshold value A2 means that an amount of displacement in positive direction (downward direction on the touch panel) of a stroke in the Y-component has become greater than the distance |A2|. In steps S310 and S311, although the threshold values are taken as A1<0, A2>0, positive and negative values may be reversed. Further, distances can be set as |A1|=|A2|, i.e., upward and downward distances for corresponding threshold values are constant, or distances can be set as |A1|≠|A2|, i.e., they are not constant depending on positive and negative.

As described above, according to determinations in steps S310 and step S311, if an amount of displacement of the touch input has becomes greater than |A1| in Y-axis/negative direction, or if the amount of displacement of the touch input has become greater than |A2| in the Y-axis/positive direction, the touch input in question is determined as a gesture recognition candidate. More specifically, if an amount of displacement from a start of the touch input has exceeded the predetermined amount in a first direction, a trajectory of movement of the touch input in question has been determined to be a part of the gesture operations.

Then in step S312, the CPU 101 holds information that a distance Sy in the Y-component has become smaller than the threshold value A1 into the memory 103. Then the processing proceeds to step S314. In step S313, the CPU 101 holds information that a distance Sy in the Y-component has exceeded the threshold value A2 into the memory 103. Then, the processing proceeds to step S314.

Figure 7A:
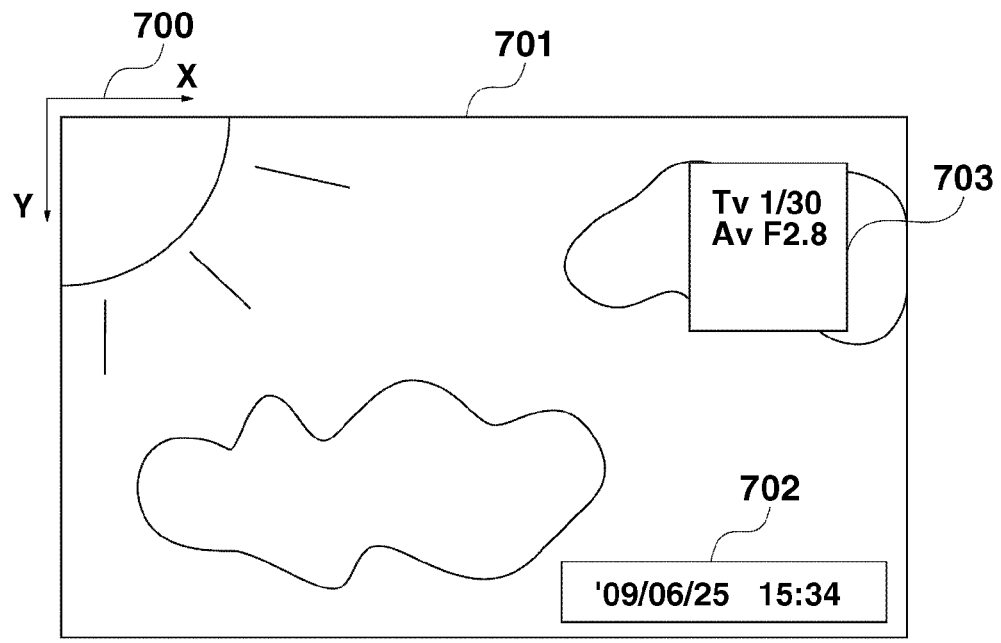
FIG. 7A illustrates a display on which only an image is displayed.

In step S314, the CPU 101 causes character information other than guidance, which will be described below, not to be displayed. Then, the processing proceeds to guidance display processing illustrated in FIG. 4. "Character information other than the guidance", as illustrated in FIG. 7A, refers to information of shot date and time 702 of an image 701 and shooting setting values 703 when the image 701 was captured, which are displayed in superimposing manner on the image 701.

On the other hand, in step S315, the CPU 101 determines whether detected event is an input event of the physical button other than the touch panel. If it is determined that the detected event is an input event of other than the touch panel (YES in step S315), then the processing proceeds to step S316. On the other hand, if it is determined that the detected event is an input event of the touch panel (NO in step S315), then the processing proceeds to step S301.

In step S316, the CPU 101 erases the gesture recognition information calculated in steps S307 and step S308, and terminates the processing. More specifically, even during operation on the touch panel, if an operation other than the touch panel such as an operation to a physical button is performed, the CPU 101 gives priority to it and terminates recognition processing of the gesture. Even if a touchup is detected after step S308, the CPU 101 does not invoke any function by the gesture.

Figure 4:
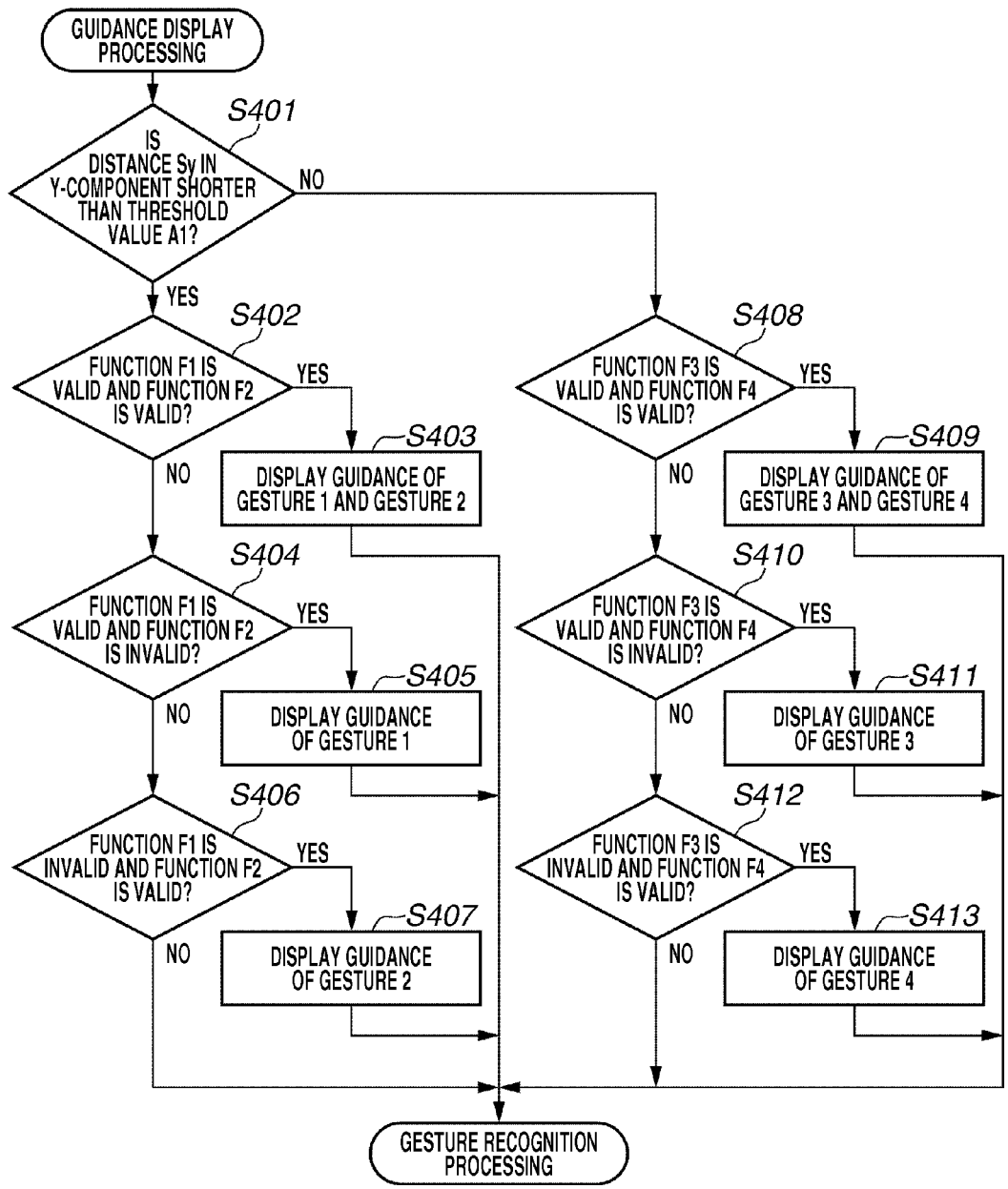
FIG. 4 is a flowchart illustrating a guidance display.

FIG. 4 is a flowchart illustrating guidance display processing, which is processing continued from step S14 in FIG. 3.

In the guidance display processing, with regards to a touch input determined as apart of the gesture operation (e.g., gesture recognition candidate), a gesture operation that can be determined by continuing the touch input in question is selected as a candidate, and guidance display is performed.

First, in step S401, the CPU 101 determines whether a distance in the Y-component is shorter than the threshold value A1. As for the determination, information held in steps S312 or S313 is to be used. If it is determined that a distance in the Y-component is shorter than the threshold value A1 (YES in step S401), then the processing proceeds to step S402. At this time point, candidates for the gesture operation are the gesture 1 and the gesture 2 in FIG. 2.

On the other hand, if it is determined that a distance in the Y-component is not shorter than the threshold value A1 (NO in step S401), which is a case where a distance in the Y-component is longer than the threshold value A2, then the processing proceeds to step S408. At this time point, candidates for the gesture operation are the gesture 3 and the gesture 4 in FIG. 2.

In the time point when the processing in steps S402 to S407 is started, as candidates for the gestures which can be discriminated by continuing the touch input in question, the gestures 1 and 2 in FIG. 2 will be selected. Therefore, a guidance display with regards to candidates for these selected gestures may be performed on the display unit 104.

However, in the present exemplary embodiment, in order to further enhance operability, a guidance display of the gestures, to which unexecutable functions at this time point, are assigned is prohibited, and a guidance display of only the gestures, to which executable functions are assigned, is performed.

First, in step S402, the CPU 101 determines whether the function F1 is valid and the function F2 is valid. In other words, it means determining whether the images can be erased, and the images can be protected with respect to the images currently displayed on the display unit 104. If the function F1 and the function F2 are valid (YES in step S402), then the processing proceeds to step S403, and executable functions are displayed. On the other hand, if the function F1 and/or the function F2 are invalid (NO in step S402), then the processing proceeds to step S404.

Figure 7B:
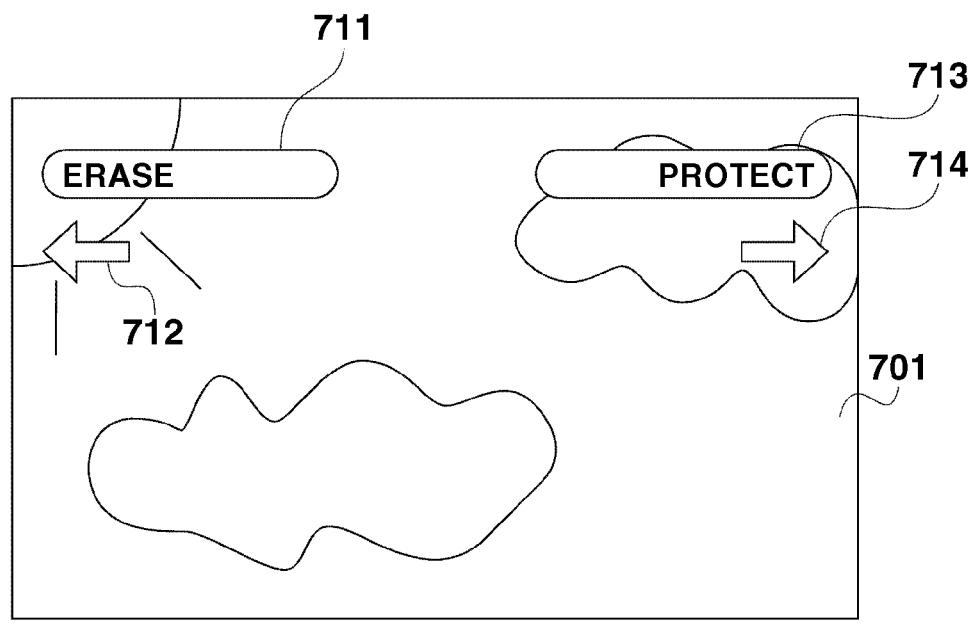
FIG. 7B illustrates a guidance display on the display screen during the gesture recognition.

In step S403, a guidance for the gesture 1 and the gesture 2 is displayed. As used herein, "guidance" refers to displaying function names and graphics, as illustrated in FIG. 7B. A function name 711 indicates a function name of the gesture 1, and is displayed in superimposed manner on an image 701. A graphics 712 represents a direction to be stroked for invoking the function of the gesture 1, and is displayed in superimposed manner on the image 701.

If a user moves the finger in a leftward direction (direction represented by the graphics 712) referring to the function name 711 and the graphics 712, while not releasing the finger from the touch panel, it is found that operation of the gesture 1 is recognized, and the image 701 can be erased. Likewise, a function name 713 and a graphics 714 relate to the gesture 2, which indicates that if the user moves the finger in a rightward direction, operation of the gesture 2 is recognized, and the image 701 can be protected.

The function name 711 and the graphics 712, the function name 713 and the graphics 714 are displayed on positions from which the touch positions should be moved for invoking the functions of respective gestures. For example, the gesture 1 is determined by a stroke to move in the Y-direction by A1 (<0), namely in an upward direction on the screen by a predetermined distance, and then to move in the X-direction by D1 (<0), namely in a leftward direction on the screen by a predetermined amount. Therefore, the touch position will move to the upper-left for executing the function assigned to the gesture 1.

In order to prompt the movement, the function name 711 and the graphics 712 as the guidance of the gesture 1 are displayed at an upper-left region (a region with x-coordinate being left side from the screen center, and Y-coordinate being upper side from the screen center) on the display screen of the display unit 104. By similar reason, the function name 713 and the graphics 714 as the guidance of the gesture 2 are displayed at an upper-right region on the display screen of the display unit 104 (a region with x-coordinate being right side from the screen center, and Y-coordinate being upper side from the screen center).

Since the determination in step S401 means that a stroke in the Y-direction has proceeded in the negative direction (upward direction), the gesture patterns that can be thereafter recognized will be limited to the gesture 1 or the gesture 2. In this case, as illustrated in FIG. 7B, only the guidance with regards to the gesture 1 and the gesture 2 is displayed. Accordingly, the need for a display with regards to the gesture patterns is eliminated. The gesture patterns cannot be recognized even when a stroke in the X-component is drawn thereafter. As a result, it becomes possible to utilize effectively a display area for displaying the guidance of the remaining patterns.

In step S404, the CPU 101 determines whether the function F1 is valid and the function F2 is invalid. In other words, it means determining whether the image can be erased, but the image cannot be protected, with regards to an image being currently displayed on the display unit 104.

If only F1 is valid (YES in step S404), then the processing proceeds to step S405. On the other hand, if F1 is not valid (NO in step S404), then the processing proceeds to step S406. In step S405, the CPU 101 displays on the display unit 104 only the guidance with regards to the gesture 1, and does not display the guidance with regards to the gesture 2.

In step S406, the CPU 101 determines whether the function F1 is invalid and the function F2 is valid. If only F2 is valid (YES in step S406), then the processing proceeds to step S407. On the other hand, if F2 is not valid (NO in step S406), then the processing proceeds to gesture recognition processing. In step S407, the CPU 101 displays on the display unit 104 only the guidance with regards to the gesture 2, and does not display the guidance with regards to the gesture 1.

On the other hand, if the processing proceeds to step S408, it means that a stroke in the Y-direction has advanced in the positive direction (downward direction). In other words, the subsequent gesture pattern will be limited to the gesture 3 or the gesture 4. Hence, respective processing in subsequent steps S408, S410, and S412 are similar to the above-described steps S402, S404, and S406, except that the function F1 is replaced by the function F3, and the function F2 by the function F4.

By similar reason to the above-described gestures 1 and 2, the function name and graphics as the guidance of the gesture 3 are displayed in a lower-left region (a region with x-coordinate being on left side from the screen center, and Y-coordinate being on lower side from the screen center) on the display screen of the display unit 104. Further, the function name and the graphics as the guidance of the gesture 4 are displayed in a lower-right region (a region with the x-coordinate being on right side from the screen center, and the Y-coordinate being on lower side from the screen center) on the display screen of the display unit 104.

As described above, there is displayed a guidance representing a function name executable by the gesture that can be identified, halfway through the gesture recognition, when a touch input is continued thereafter. Consequently, it is possible to discriminate what function can be invoked by continuing the gesture operation being currently performed by the user. That is, it is possible for a user to check whether the gesture operation that the user intends until the present time is being properly performed.

Further, there is displayed a guidance representing a function name executable by a gesture that can be determined by continuing the touch input, as well as a guidance representing a direction to be stroked for invoking the function. Consequently, the user can visually notice easily what operation must be performed thereafter to perform the gesture recognition, and as a result, the gesture operation becomes easy.

In step S405, it has been described that the guidance is not displayed if the function F2 is invalid, however, the guidance may be displayed to be distinguishable from a case where the function F2 is valid by changing a display form, for example. In this case, if both the functions F1 and F2, for example, are not valid, it becomes possible to notify the user of it. That is, the user can know that candidates for a gesture operation exist, but a gesture operation corresponding to executable functions does not exist.

Although a guidance has been described as the function name and graphics, an arrow mark indicating, for example, a movement in X-component may be included as the guidance. An example in which a guidance display is static has been given, but, as a guide for an operation for drawing a stroke, the operation may be guided by using animation expressions.

By non-displaying information related to operations other than candidates for a gesture operation in step S314, information that has no relation with the gesture recognition can be non-displayed, and only information desired to be notified can be displayed. For this reason, the present exemplary embodiment is advantageous that the user can easily perform operation, and a limited display area can be used effectively since the display area can be utilized with the guide of the gesture recognition.

In the present exemplary embodiment, only the gesture operation has been described, but gesture operation is not the only one operation that can be performed on the touch panel. For example, when dragging in positive direction of X-component after touchdown, operation to display the next image is also possible, or when dragging in negative direction, operation to display the previous image is also possible.

In other words, it is desirable that a plurality of operations can be performed with one screen. However, in this case, in spite that the user believes to have performed operation of the next image display, the use may erroneously have dragged in the Y-component even if only slightly. As a result, there is possibility that a guidance of the gesture will be eventually displayed in the guidance display processing in FIG. 4.

For a user who wants to perform image advancing, such guidance display will become an obtrusive guidance. For this reason, in the present exemplary embodiment, as described in steps S310 and S311, the gesture recognition and the image advancing processing are discriminated from each other, by making an attempt not to display the guidance before a distance in the Y-component reaches the threshold value. Hence, the present exemplary embodiment is advantageous in that comfortable image viewing can be made without being bothered by unrelated guide displays during image viewing.

Figure 5:
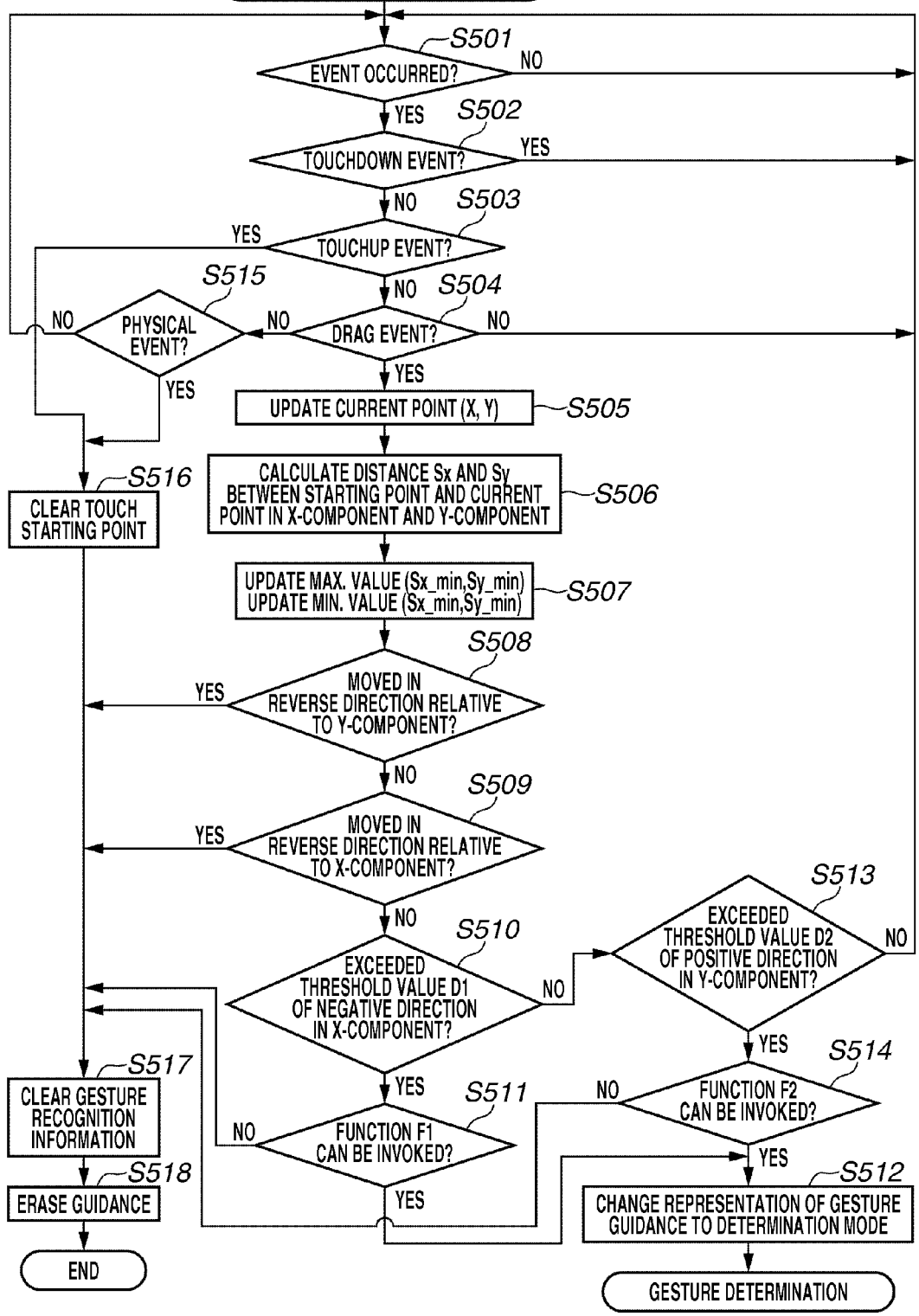
FIG. 5 is a flowchart illustrating a gesture confirmation.

Next, a case of changing, in the middle of the gesture recognition, the guidance displayed at the time when the gesture is determined will be described. FIG. 5 is a flowchart for the gesture recognition processing continued from FIG. 4, illustrating a case where a distance Sy in the Y-component is shorter than the threshold value A1 (has been a stroke in upward direction). In this case, candidates for the gesture are the gesture 1 or the gesture 2.

The processing in steps S501 and S502 are similar to those in the above-described steps S301 and S302. In step S502, if it is determined that the event is a touchdown event (YES in step S502), then the processing proceeds to step S501. On the other hand, if it is determined that the event is not a touchdown event (NO in step S502), then the processing proceeds to step S503. The processing in step S503 is similar to that in the above-described step S304.

If it is determined that the event is a touchup event (YES in step S503), then the processing proceeds to step S516. On the other hand, if it is determined that the event is not a touchup event (NO in step S503), then the processing proceeds to step S504. The processing in step S504 is similar to that in the above-described step S306. If it is determined that the event is a drag event (YES in step S504), then the processing proceeds to step S505. On the other hand, if it is determined that the event is not a drag event (NO in step S504), then the processing proceeds to step S515.

The processing in steps S505 and S506 are similar to those in the above-described steps S307 and S308. When the processing in step S506 is completed, then the processing proceeds to step S507. In step S507, if values of Sx and Sy calculated in step S506 are greater than maximum values Sx_max and Sy_max within the same stroke respectively, the CPU 101 substitutes Sx and Sy into Sx_max and Sy_max, to update the maximum values.

In a similar way, if the values of Sx and Sy are smaller than minimum values Sx_min and Sy_min within the same stroke, respectively, the CPU 101 substitutes Sx and Sy into Sx_min and Sy_min, to update the minimum values. Then, the processing proceeds to step S508.

In step S508, the CPU 101 determines whether the current (touch) point has moved in the reverse direction relative to the Y-direction. If it is determined that the current point has moved in the reverse direction (YES in step S508), then the processing proceeds to step S517. The CPU 101 clears the gesture recognition information. On the other hand, if it is determined that the current point has not moved in the reverse direction (NO in step S508), then the processing proceeds to step S509.

A determination in step S508 will be described in detail. If the stroking is performed, for example, in the negative direction relative to the Y-component, Sy_min has negative value, and Sy has also negative value. Then, a difference between the value of Sy_min and the value of Sy is calculated arithmetically. If there is a difference, it means that the current point C has been moved in the reverse direction relative to the stroke in the Y-component. If the stroking is reversely performed in the positive direction relative to the Y-component, a difference between the value of Sy_max and the value of Sy is calculated arithmetically. By doing so, it becomes possible to determine whether the stroking is performed exactly according to the gesture pattern.

Further a margin may be added to the above-described difference between the value of Sy_min and the value of Sy. In other words, this is a method for determining that, when a difference between the value of Sy_min and the value of Sy has exceeded a predetermined amount, the current point has been moved in the reverse direction. For example, when the predetermined amount is B2, if Sy−Sy_min>B2 is obtained, then it is determined that the current point has been moved in the reverse direction.

Consequently, even a user thinks to have touched one point in a way with the user's finger or the like, the coordinate which have been input into a touch panel device may detect very small movement. In such a case, it becomes possible to prevent erroneous detections.

In step S509, the CPU 101 determines whether the current point has been moved in the reverse direction relative to the X-direction. If it is determined that the current point has been moved in the reverse direction (YES in step S509), then the processing proceeds to step S517. The CPU 101 clears gesture recognition information. On the other hand, if it is determined that the current point has not been moved in the reverse direction (NO in step S509), then the processing proceeds to step S510.

Now, the details of step S509 will be described, taking the determination of the gesture 2 as an example. In an operation in the middle of the recognition of the gesture 2, drawing a stroke in the positive direction of the X-component is in progress. Therefore, the value of Sx_max is positive value, and Sx is also positive value. At this time, a difference between the value of Sx_max and the value of Sx is calculated arithmetically. If there is a difference, it means that the current point C has been moved in the reverse direction relative to the stroke in the positive direction of the X-component.

If it is determined that the current point has been moved in the reverse direction (YES in step S509), then the processing proceeds to step S517, and the CPU 101 clears the gesture recognition information. Further, in a manner similar to step S508 described above, by letting a predetermined amount be B3, for example, and satisfying Sx_max−Sx>B3, the processing may be prevented from jumping to step S516, when an erroneous operation is performed. It is exactly the same with regards to a case of determining the gesture 1. In this case, since Sx_min and Sx take negative values, by calculating a difference between the value of Sx_min and the value of Sx, it is determined that the current point C has been moved in the reverse direction relative to the stroke in the negative direction of the X-component.

In this manner, after function names executable by continuing the touch input, halfway through the gesture operation, have been displayed, then an operation, which is determined as Yes in any of steps S503, S508, S509, and S515, is performed. At this time, any function invocation by the gesture operation can be avoided.

Therefore, if the user, by viewing the function names displayed halfway through the gesture operation, finds that intended functions cannot be invoked by the gesture operation performed until the present time, the user can cancel the gesture operation, and can avoid invoking the functions of the displayed function names. In this manner, invocation of unintended function by the gesture operation can be prevented.

In step S510, the CPU 101 determines whether a distance Sx in the negative direction of the X-component is shorter than the threshold value. If it is determined that the distance has exceeded the threshold value (YES in step S510), then the processing proceeds to step S511. If it is determined that the distance has not exceeded the threshold value (NO in step S510), then the processing proceeds to step S513. This judgment is performed to determine whether a distance of the X-component has satisfied a distance necessary for recognizing the gesture 1. In step S511, the CPU 101 determines whether the function F1 can be invoked. If it is determined that the function F1 can be invoked (YES in step S511), then the processing proceeds to step S512. On the other hand, if it is determined that the function F1 cannot be invoked (NO in step S511), then the processing proceeds to step S517.

On the other hand, in step S513, the CPU 101 determines whether a distance Sx in the positive direction of the X-component has exceeded the threshold value. If it is determined that the distance has exceeded the threshold value (YES in step S513), then the processing proceeds to step S514. On the other hand, if it is determined that the distance has not exceeded the threshold value (NO in step S513), then the processing proceeds to step S501. The judgment is performed to determine whether a distance of the X-component has satisfied a distance necessary for recognizing the gesture 2. In step S514, the CPU 101 determines whether the function F2 can be invoked. If it is determined that the function F2 can be invoked (YES in step S514), then the processing proceeds to step S512. On the other hand, if it is determined that the function F2 cannot be invoked (NO in step S514), then the processing proceeds to step S517.

Figure 8A:
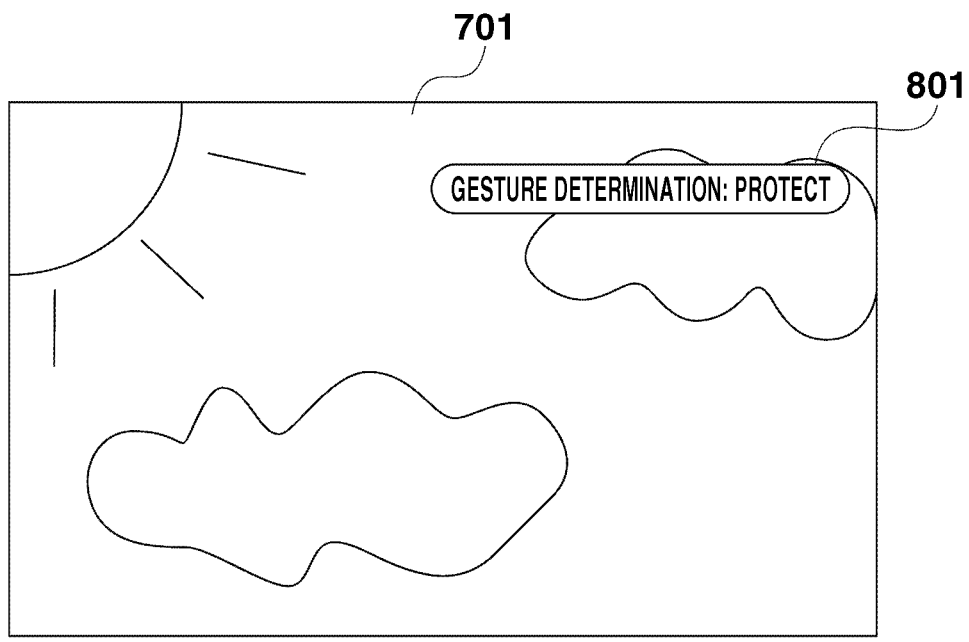
FIG. 8A illustrates the guidance display on the display screen at the gesture confirmation (determination).

In step S512, the CPU 101, as illustrated in FIG. 8A, changes a display of the gesture guidance to a display of a confirmation mode, and determines (confirms) the gesture. When the gesture is determined, a function executable by the gesture operation in the current touch input is determined. Information of the determined gesture is stored in the memory 103. The present example indicates a state where operation of the gesture 2 is determined.

In FIG. 8A, there is illustrated a state where the function name 711 and the graphics 712 and 714 of the gesture 1 are erased, different from FIG. 7B, and the display 801 indicating the determination result of the gesture 2 is displayed. By thus displaying, the user finds that the gesture 2 has been recognized in the apparatus by the stroke until the present time, and when releasing the finger at this time, the user can identify that the function assigned to the gesture 2 is invoked.

It is apparent that the display illustrating the confirmed state is not limited to this. The confirmation state may be indicated by erasing only the graphics (e.g., the graphics 714) indicating movement direction of the touch input, while the display of the function name 713, for example, is remained.

Further, the confirmed state may be indicated by changing display patterns such as colors and shapes of the function name 713 and the graphics 714, without erasing the function name 713 and the graphics 714, or the confirmed state may be indicated by affixing frames or marks to the function name 713 and the graphics 714, for example.

The processing in step S515 is similar to that in step S315 described above. If it is determined as an input event other than the touch panel (YES in step S515), then the processing proceeds to step S516. On the other hand, if it is determined as an input event of the touch panel (NO in step S515), then the processing proceeds to step S501. In step S516, the CPU 101 erases touch starting-point information stored in step S305, and advances the processing to step S517. The processing in step S517 is similar to that in step S316 described above.

In step S518, the CPU 101 causes the guidance displayed in the processing of the flowchart in FIG. 4 (guidance display processing) not to be displayed, to thus return to the display state illustrated in FIG. 7A, and terminates the processing. Even when a touch up is detected after step S518, any function by the gesture will not be invoked.

In FIG. 5, an example of the gesture determination when determining the functions F1 or F2 has been described. However, for the gesture determination when the functions F3 or F4 is determined, similar processing is performed by reversing the positive and negative signs of the Y-direction, and thus description thereof will be omitted.

Figure 6:
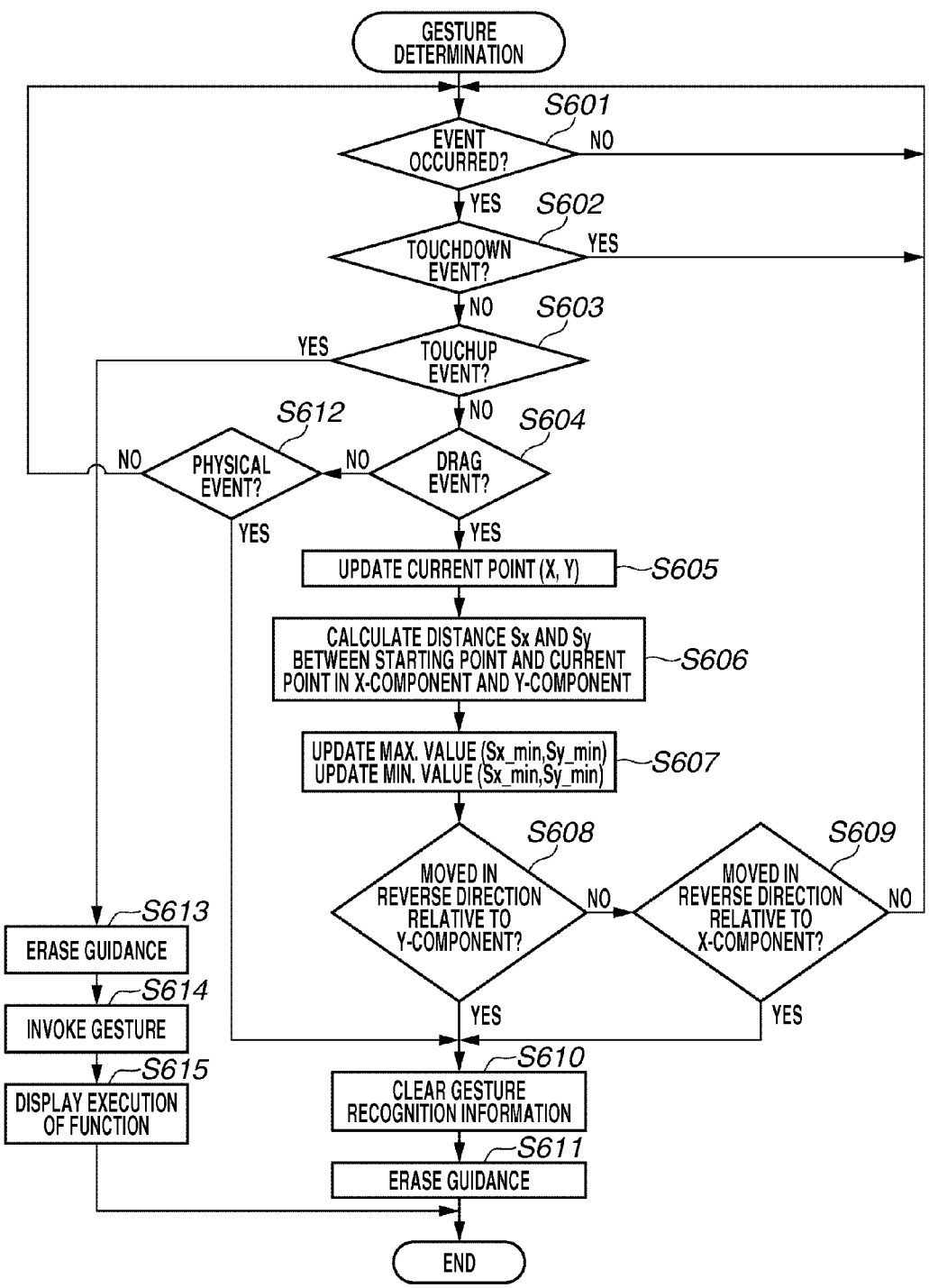
FIG. 6 is a flowchart illustrating a gesture function invocation (determination).

FIG. 6 is a flowchart illustrating a case of invoking the function assigned to the gesture after the gesture determination, which is the processing continued from step S512 in FIG. 5. The processing in steps S601 and S602 is similar to those in the above step S301 and step S302.

In step S602, if it is determined that the gesture is a touchdown event (YES in step S602), then the processing proceeds to step S601. On the other hand, if it is determined that the gesture is not a touchdown event (NO in step S602), then the processing proceeds to step S603. The processing in step S603 is similar to that in step S304 described above.

If it is determined that the gesture is a touchup event (YES in step S603), then the processing proceeds to step S613. On the other hand, if it is determined that the gesture is not a touchup event (NO in step S603), then the processing proceeds to step S604. The processing in Step S604 is similar to that in step S306 described above.

If it is determined that the gesture is a drag event (YES in step S604), then the processing proceeds to step S605. On the other hand, if it is determined that the gesture is not a drag event (NO in step S604), then the processing proceeds to step S612.

The processing in step S605 to S607 is similar to that in step S505 to S507 described above. In step S608, the CPU 101 determines whether the Y-component of the touch input has been reversed, namely, whether the current point has been moved in 180-degree opposite direction (third direction) relative to the Y-direction (first direction) of the stroke of the determined gesture. If it is determined that the current point has been moved in the reverse direction relative to the Y-component (YES in step S608), then the processing proceeds to step S610. On the other hand, if it is determined that the current point has not been moved in the reverse direction (NO in step S608), then the processing proceeds to step S609.

Further, in step S609, the CPU 101 determines whether the X-component of the touch input has been reversed, namely, the current point has been moved in 180-degree opposite direction (fourth direction) relative to the X-direction of the stroke of the determined gesture (second direction). If the CPU 101 determines that the current point has been moved in the reverse direction relative to the X-component (YES in step S609), the CPU 101 causes the processing to proceed to step S610. On the other hand, if the CPU 101 determines that the current point has not been moved (NO in step S609), the CPU 101 returns the processing to step S601. A method for determination in steps S608 and S609 is as described in steps S508 and S509.

In step S610, the gesture recognition information acquired up to this point is erased. More specifically, the determination of the gesture is canceled by erasing information of the gesture determined in step S512 from the memory 103. The processing in step S611 is similar to that in step S518 described above. Even when the touchup is detected after step S611, the function of the gesture is not invoked. Further, the processing in step S612 is similar to that in step S315 described above.

Figure 8B:
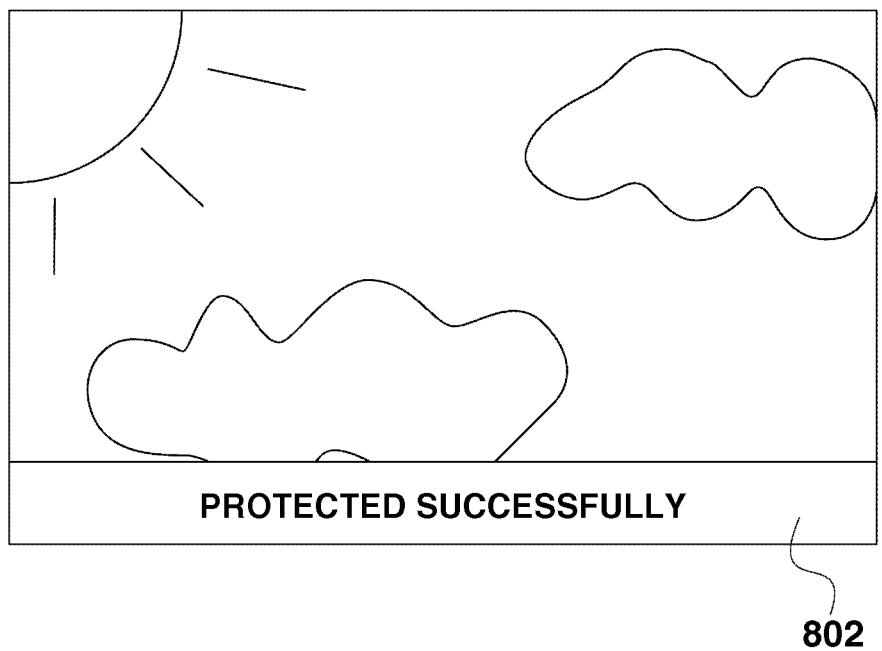
FIG. 8B illustrates display on the display screen after a gesture function has been invoked.

If it is determined that the event is an input event other than the touch panel (YES in step S612), then the processing proceeds to step S610. On the other hand, if it is determined that the event is an input event of the touch panel (NO in step S612), then the processing proceeds to step S601. The processing in step S613 is similar to that in step S518 described above. After step S613, in step S614, the CPU 101 invokes (executes) assigned function. In step S615, the CPU 101 displays that the function has been executed ("PROTECTED SUCCESSFULLY" in area 802), as illustrated in FIG. 8B.

Until the user executes touchup, even after the gesture has been thus determined in step S512, by performing operations which have been determined as YES in steps S608, S609, and S612, it is possible to cancel the execution of the function assigned to the determined gesture.

To be determined as YES in steps S608, S609, and S612 corresponds to a second condition. More specifically, the user can check whether the intended function is invoked by watching the display of the confirmation mode in step S512 and by confirming the function assigned to the determined (confirmed) gesture.

If it is found that an unintended function is invoked, the user can cancel the gesture operation even thereafter, and can avoid executing the function displayed in the confirmation mode.

As described above, before the function is invoked by the gesture operation, it is possible to display what functions can be invoked by the movement of the touch position until the present time so that the user can discriminate them. Accordingly, the user can cancel the gesture recognition and can avoid invoking the function. More specifically, the user can recognize whether the gesture operation currently being performed is wrong. If the gesture operation is wrong, the gesture operation currently being performed can be canceled.

Therefore, the function that the user does not intend can be prevented more surely from being eventually invoked by the gesture operation.

Figure 9:
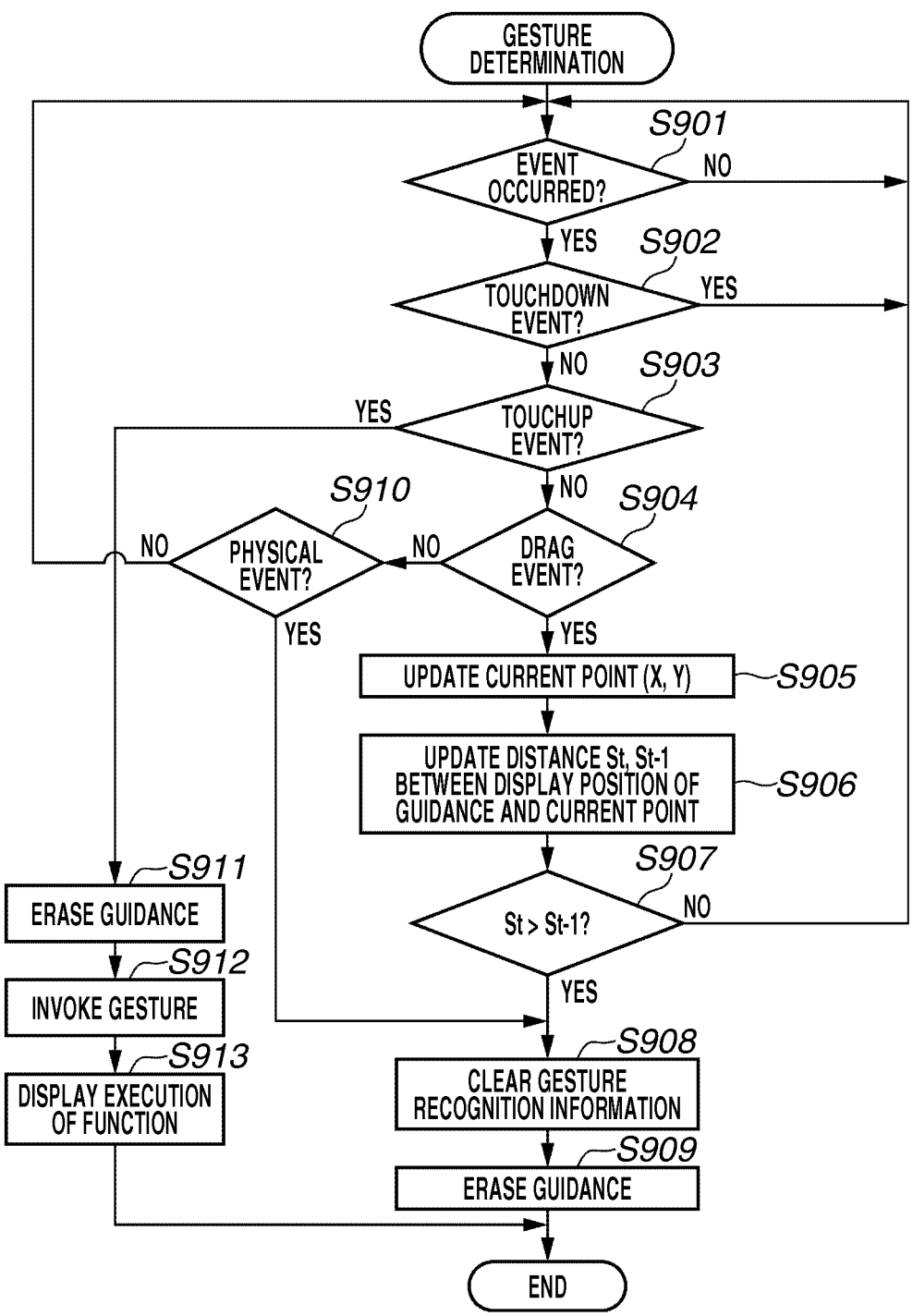
FIG. 9 is a flowchart illustrating the gesture function invocation.

In a second exemplary embodiment, an example of another method for canceling the gesture after the gesture is determined will be described. FIG. 9 is a flowchart illustrating the processing continued from step S512 in FIG. 5 described in the first exemplary embodiment, and the gesture cancellation in a case of dragging in a direction other than function name displaying direction after the gesture is determined. The processing illustrated in the flowchart in FIG. 9 is realized by causing the CPU 101 to execute a program stored in the external storage medium 108.

The processing in step S901 to S905 are similar to those in the above S601 to S605, and thus descriptions thereof will be omitted.

In step S906, the CPU 101 calculates a distance between the displayed position of the guidance and the current point. Here, St is a distance between the displayed position of the guidance at the present time (time t) and the current touch point. St−1 is a distance between the displayed position of the guidance at one preceding time (time t−1) and the previous touch point.

In the present exemplary embodiment, a displayed position of the guidance is at barycentric coordinates of a display region of the display 801 indicating the determination of the gesture described above in FIG. 8A. However, it is not limited to this, but the displayed position of the guidance may be at coordinates farthest from the center coordinate of the display unit 104, in a display region of the display 801 representing the determination of the gesture. When a distance between the displayed position of the guidance and the current point is calculated, then the processing proceeds to step S907.

In step S907, it is determined whether St obtained in step S906 is greater than St−1. If it is determined that St is greater than St−1 (YES in step S907), then the processing proceeds to step S908. On the other hand, if it is determined that St is not greater than St−1 (NO in step S907), then the processing proceeds to step S901.

The processing in steps S908 and S909, S910, S911 to S913 are similar to that in steps S610 and S611, S612, S613 to S615, respectively, and thus descriptions thereof will be omitted.

As described above, in the second exemplary embodiment, the guidance is displayed and dragging to the displayed position of the guidance is prompted, and when dragging is executed in a direction moving away from the displayed position of the guidance, then gesture recognition is canceled. More specifically, it becomes possible to surely invoke the assigned function by controlling not to cancel the gesture recognition, as long as the dragging is directed toward the guidance displayed position.

In a third exemplary embodiment, an example of canceling the determined gesture after the gesture is determined, and invoking another gesture function without performing touchup will be described.

Figure 10:
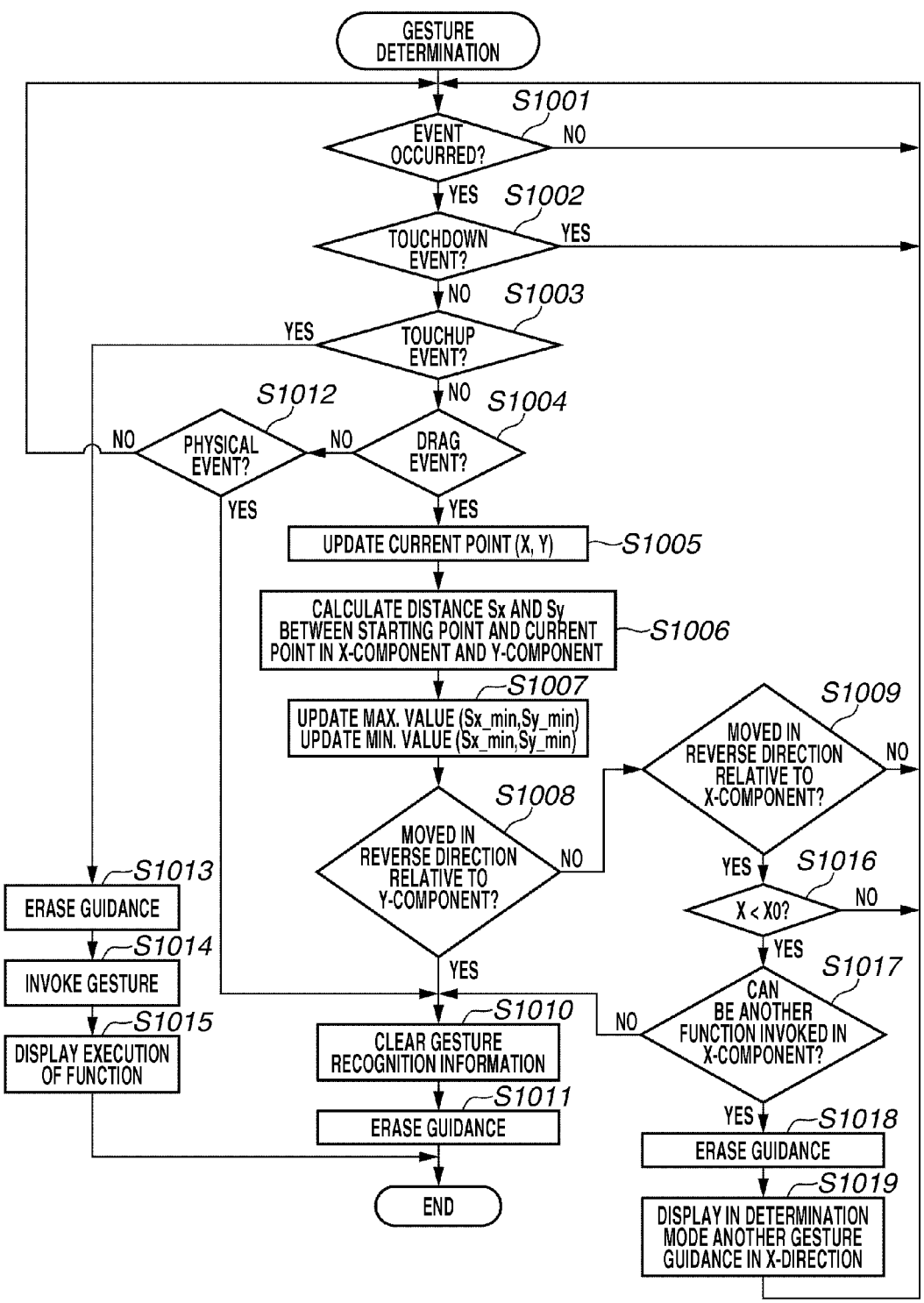
FIG. 10 is a flowchart illustrating the gesture function invocation.

FIG. 10 is a flowchart illustrating the processing continued from step S512 in FIG. 5 described in the first exemplary embodiment, and a case of canceling the gesture after the gesture determination, and invoking another gesture function without performing the touchup. The processing illustrated by the flowchart in FIG. 10 is realized by causing the CPU 101 to execute a program stored in the external storage medium 108.

The processing in steps S1001 to S1015 is similar to those in steps S601 to S615 described above, and thus descriptions thereof will be omitted.

In step S1009, if it is determined that the current point has been moved in the reverse direction relative to the X-direction (YES in step S1009), then the processing proceeds to step S1016. On the other hand, if it is determined that the current point has not been moved in the reverse direction relative to the X-direction (NO in step S1009), then the processing proceeds to step S1001.

In step S1016, it is determined whether X is smaller than X-coordinate $X_0$ of a touch starting point stored in step S303. This is performed to determine whether the current point has been moved in the opposite direction enough to straddle the touch starting position relative to the X-direction (third condition). If it is determined that the X is smaller than the X-coordinate $X_0$ (YES in step S1016), then the processing proceeds to step S1017. On the other hand, if it is determined that the X is not smaller than the X-coordinate $X_0$ (NO in step S1016), then the processing proceeds to step S1001.

In step S1017, it is determined whether a function assigned to the other gesture, in the X-direction, can be invoked. If it is determined that the other function can be invoked (YES in step S1017), then the processing proceeds to step S1018. On the other hand, if it is determined that the other function cannot be invoked (NO in step S1017), then the processing proceeds to step S1010.

"Other gesture in X-direction" refers to a gesture with the same stroke direction in the Y-direction, and opposite direction in the X-direction. More specifically, the other gesture in the X-direction with respect to the gesture 1 is the gesture 2, and the other gesture in the X-direction with respect to the gesture 2 is the gesture 1. Likewise, the other gesture in the X-direction with respect to the gesture 3 is the gesture 4, and the other gesture in the X-direction with respect to the gesture 4 is the gesture 3.

In step S1018, the guidance display in the confirmation mode displayed in step S512 is erased, and then the processing proceeds to step S1019.

In step S1019, the CPU 101, in place of the gesture (first function) determined in step S512, determines the other gesture in the X-direction (second function) with respect to the gesture determined in step S512, and provides the guidance display in the confirmation mode.

As described above, even after the gesture is determined, by canceling the already determined gesture when dragging in another direction has been executed, and by determining another gesture, it becomes possible to make re-selection even after the gesture determination.

In the above-described respective exemplary embodiments, some functions may be invoked taking vibration detected by the sensor 112 as a trigger. In such cases, even if a vibration is detected by the sensor 112 halfway through the gesture operation, the function taking the vibration as the trigger is not invoked, and the gesture operation is not canceled.

This is because, since there is possibility that the vibration of the apparatus may be eventually caused by a touch for the gesture operation, the possibility of the user's intended operation is less compared with operation of operation member. Thereby, cancellation of the gesture at an unintended timing can be prevented.

In the above-described exemplary embodiments, a case where the display control apparatus according to the present invention is applied to a digital camera has been described, but it is not limited to this. It is obvious that the display control apparatus according to the present invention can be applied to any information processing apparatus that enables touch input, such as a portable information terminal (personal digital assistant (PDA)).

Further, in the above-described exemplary embodiments, simple strokes by combinations of upward/downward/leftward/rightward are given as gesture patterns, but it is not limited to these. For example, combinations of movement trajectories of upward and downward directions and oblique direction may be used, or movement trajectories of curves may be used.

Moreover, in the above-described exemplary embodiments, gesture patterns formed by two types of movement trajectories of upward and downward directions and leftward/rightward directions are given, but gesture patterns formed by movement trajectories of three types or more such as upward direction→rightward direction→oblique rightward upward direction may be used.

The present invention has been described in detail based on preferred exemplary embodiments, but the present invention is not limited to these particular exemplary embodiments, various modes within the scope not departing from the spirit of the present invention are also to be included in the present invention. Apart of the above-described exemplary embodiments may be combined as appropriate.

The above-described control may be performed by one piece of hardware, or control of the entire apparatus may be performed by a plurality of pieces of hardware sharing the processing.

The above-described respective exemplary embodiments only indicate one exemplary embodiment of the present invention, and it is also possible to combine as appropriate respective exemplary embodiments.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-189329 filed Aug. 18, 2009, which is hereby incorporated by reference herein in its entirety.

What is claimed is:

1. An apparatus comprising:
a detection unit configured to detect a touch onto a display screen of a display unit;
a display control unit configured to perform control:
to display on the display unit first guide information indicating functions executable by an operation following a movement of the touch position from an original position on the display screen to a current position on the display screen without releasing the detected touch,
to display second guide information indicating a function among the functions indicated by the first guide information to be executed at a time when the detected touch is released when the movement of the touch position satisfies a first condition without releasing the detected touch, and
to terminate display of the second guide information when the movement of the touch position of the detected touch satisfies a second condition without releasing the touch after the movement of the touch position satisfies the first condition, the second guide information indicating whether the function to be executed is invoked; and
a control unit configured to perform control to execute the function indicated by the second guide information, when the detected touch is released while the second guide information is being displayed.

2. The apparatus according to claim 1,
wherein the first condition is that, after a movement component of a first direction on the display screen of the touch position of the detected touch has reached a predetermined distance or more, a movement component of a second direction perpendicular to the first direction becomes a predetermined distance or more, and
wherein the second condition is that at least one of a movement component of a third direction that is 180-degree opposite to the first direction of touch position, after the movement of the touch position satisfies the first condition, becomes a predetermined distance or more, or a movement component of a fourth direction that is 180-degree opposite to the second direction becomes a predetermined distance or more.

3. The apparatus according to claim 1, wherein the second condition is that the touch position, after the movement of the touch position satisfies the first condition, moves in a direction away from a displayed position of the second guide information being displayed by the display control unit.

4. The apparatus according to claim 1, wherein the display control unit further performs control to terminate display of the second guide information by detecting an operation to an operation member other than the touch onto the display screen.

5. The apparatus according to claim 4, further comprising:
a vibration detection unit configured to detect vibration of the apparatus; and
an execution unit configured to execute a function triggering the vibration detected by the vibration detection unit, wherein the display control unit does not terminate the display of the second information in a case where the vibration detection unit detects vibration while the second guide information is being displayed.

6. The apparatus according to claim 1, wherein, before the confirmation, the display control unit performs control to display a plurality of functions executable by continuing the gesture operation that has been detected as the first guide information.

7. The apparatus according to claim 1,
wherein the function indicated by the first guide information and the second guide information is a function executable on an image that is displayed on the display unit, and
wherein the display control unit performs control to display the first guide information and the second guide information in superimposing manner on the image.

8. The apparatus according to claim 1, wherein the display control unit performs control to display the first guide information at a position to which the touch position of the detected touch should be moved for executing the function indicated by the first guide information.

9. The apparatus according to claim 1, wherein the display control unit, when a movement of the touch position satisfies a third condition after the movement of the touch position satisfied the first condition and the second guide information is displayed to indicate a first function, performs control to display a second function in place of the first function as the second guide information.

10. The apparatus according to claim 1, wherein the display control unit displays the first guide information on the display unit after terminating display of information being displayed before the display of the first guide information, and the display control unit terminates the display of the second guide information and displays the information having been displayed before the display of the first guide information when the second condition is satisfied.

11. The apparatus according to claim 1, wherein the display control unit performs control to display an image and shooting information regarding shooting the image, displays on the display unit the first guide information after terminating the display of the shooting information, and terminates the display of the second guide information and displays the shooting information when the second condition is satisfied.

12. The apparatus according to claim 1, wherein the control unit does not execute any of the function assigned as function executable by the gesture operations, when the detected touch is released in a state where the second guide information is erased after the movement of the touch position satisfies the second condition.

13. A control method comprising:
detecting a touch onto a display screen of a display unit;
performing control
to display on the display unit first guide information representing functions executable by an operation following a movement of a touch position of the detected touch from an original position on the display screen to a current position on the display screen without releasing the detected touch,
to display second guide information indicating a function among the functions indicated by the first guide information to be executed at a time when the detected touch is released when the movement of the touch position satisfies a first condition without releasing the detected touch and
to terminate display of the second guide information when a movement of the touch position satisfies a second condition without releasing the touch after the movement of the touch position satisfies the first condition, the second guide information indicating whether the function to be executed is invoked; and
performing control to execute the displayed function indicated by the second guide information, when the detected touch is released while the second guide information is displayed.

14. The method according to claim 13,
wherein the first condition is that, after a movement component of a first direction on the display screen of the touch position of the detected touch has reached a predetermined distance or more, a movement component of a second direction perpendicular to the first direction becomes a predetermined distance or more, and
wherein the second condition is that at least one of a movement component of a third direction that is 180-degree opposite to the first direction of touch position, after the movement of the touch position satisfies the first condition, becomes a predetermined distance or more, or a movement component of a fourth direction that is 180-degree opposite to the second direction becomes a predetermined distance or more.

15. The method according to claim 13, wherein the second condition is that the touch position, after the movement of the touch position satisfies the first condition, moves in a direction away from a displayed position of the second guide information being displayed by a display control unit.

16. The method according to claim 13, further comprising performing control to terminate display of the second guide information by detecting an operation to an operation member other than the touch onto the display screen.

17. The method according to claim 16, further comprising detecting vibration apparatus; and executing a function triggering the vibration detected by the vibration detection unit, wherein the performing control does not terminate the display of the second information in a case where the detecting detects vibration while the second guide information is being displayed.

18. The method according to claim 13, further comprising not to execute any of the function assigned as function executable by the gesture operations, when the detected touch is released in a state where the second guide information is erased after the movement of the touch position satisfies the second condition.

19. A non-transitory computer-readable storage medium storing a program for causing a computer to act as:
a detection unit configured to detect a touch onto a display screen of a display unit;
a display control unit configured to perform control:
to display on the display unit first guide information indicating functions executable by an operation following a movement of a touch position of the detected touch from an original position on the display screen to a current position on the display screen without releasing the detected touch, to display second guide information indicating a function among the functions indicated by the first guide information to be executed at a time when the detected touch is released when the movement of the touch position satisfies a first condition without releasing the detected touch; and to terminate display of the second guide information when a movement of the touch position of the detected touch satisfies a second condition without releasing the touch after the movement of the touch position satisfies the first condition, the second guide information indicating whether the function to be executed is invoked; and a control unit configured to perform control to execute the function indicated by the second guide information, when the detected touch is released while the second guide information is being displayed.

20. The non-transitory computer-readable storage medium according to claim 19, wherein the first condition is that, after a movement component of a first direction on the display screen of the touch position of the detected touch has reached a predetermined distance or more, a movement component of a second direction perpendicular to the first direction becomes a predetermined distance or more, and wherein the second condition is that at least one of a movement component of a third direction that is 180-degree opposite to the first direction of touch position, after the movement of the touch position satisfies the first condition, becomes a predetermined distance or more, or a movement component of a fourth direction that is 180-degree opposite to the second direction becomes a predetermined distance or more.

21. The non-transitory computer-readable storage medium according to claim 19, wherein the second condition is that the touch position, after the movement of the touch position satisfies the first condition, moves in a direction away from a displayed position of the second guide information being displayed by the display control unit.

22. The non-transitory computer-readable storage medium according to claim 19, wherein the display control unit further performs control to terminate display of the second guide information by detecting an operation to an operation member other than the touch onto the display screen.

23. The non-transitory computer-readable storage medium according to claim 22, further comprising:

a vibration detection unit configured to detect vibration of the apparatus; and an execution unit configured to execute a function triggering the vibration detected by the vibration detection unit, wherein the display control unit does not terminate the display of the second information in a case where the vibration detection unit detects vibration while the second guide information is being displayed.

24. The non-transitory computer-readable storage medium according to claim 19, wherein the control unit does not execute any of the function assigned as function executable by the gesture operations, when the detected touch is released in a state where the second guide information is erased after the movement of the touch position satisfies the second condition.

* * * * *